Jan. 19, 1937.  R. R. STEVENS  2,068,357
BRAKE AND CLUTCH CONTROL DEVICE
Filed April 26, 1933  3 Sheets-Sheet 1
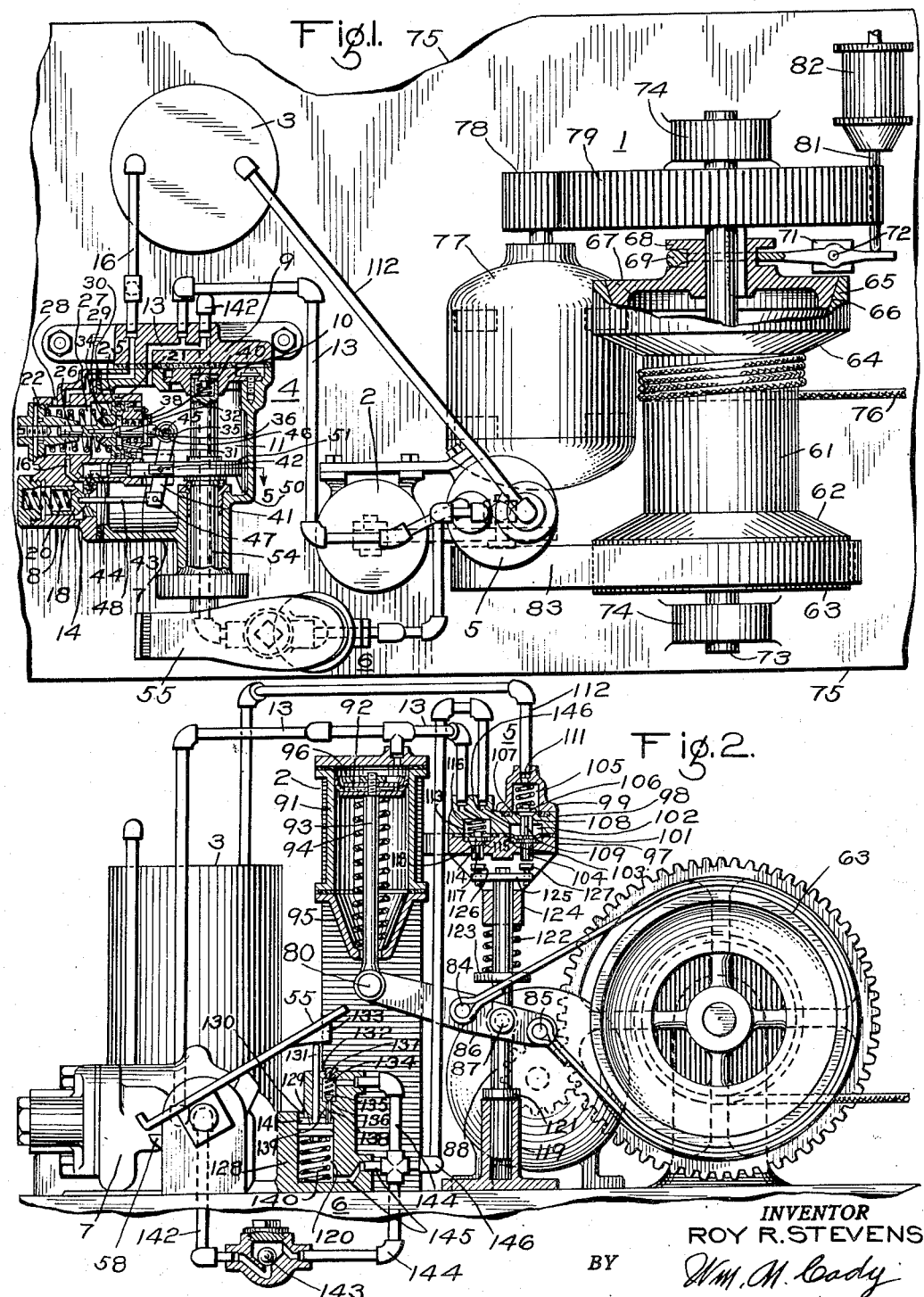
INVENTOR
ROY R. STEVENS
BY Wm. M. Cady
ATTORNEY Jan. 19, 1937.   R. R. STEVENS   2,068,357
BRAKE AND CLUTCH CONTROL DEVICE
Filed April 26, 1933   3 Sheets-Sheet 2
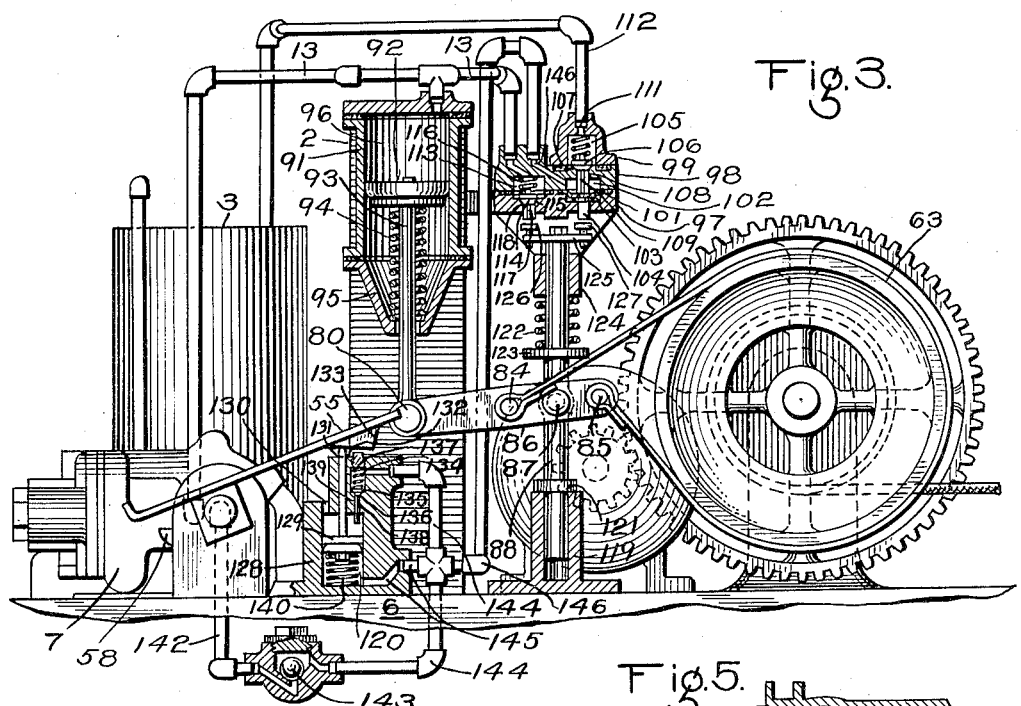
Fig.3.
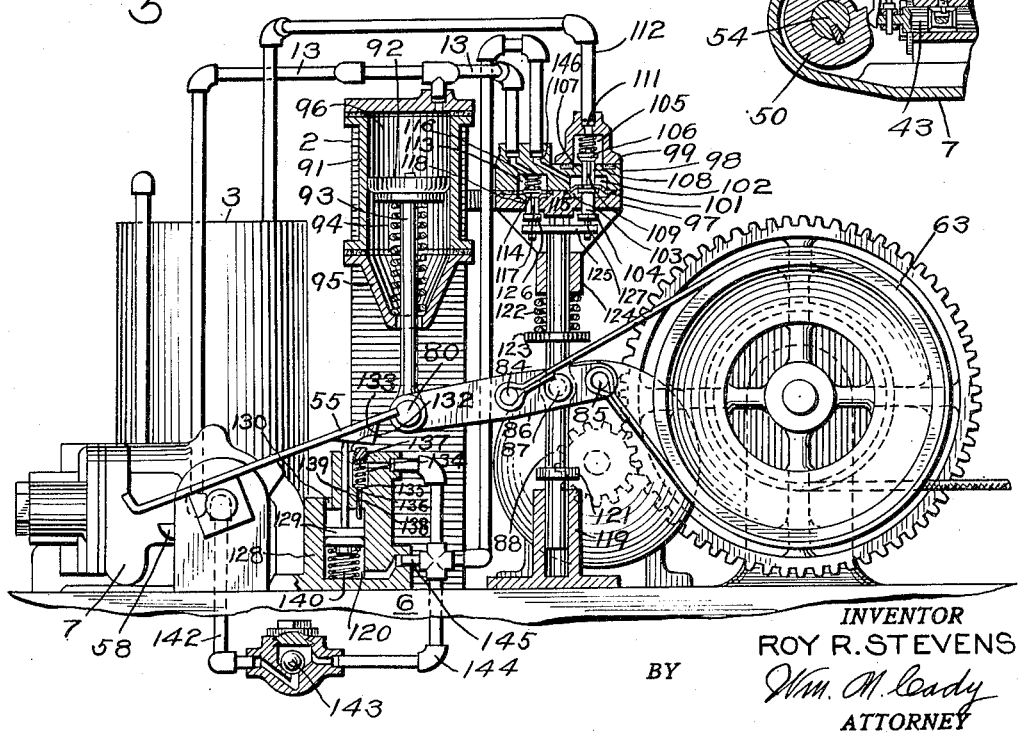
Fig.4.
Fig.5.
INVENTOR
ROY R. STEVENS
BY
Wm. M. Cady
ATTORNEY Jan. 19, 1937.    R. R. STEVENS    2,068,357
BRAKE AND CLUTCH CONTROL DEVICE
Filed April 26, 1933    3 Sheets-Sheet 3

INVENTOR.
ROY R. STEVENS
BY
Wm. M. Cady
ATTORNEY

Patented Jan. 19, 1937

2,068,357

UNITED STATES PATENT OFFICE 2,068,357

BRAKE AND CLUTCH CONTROL DEVICE

Roy R. Stevens, Forest Hills, Pa., assignor to The Westinghouse Air Brake Company, Wilmerding, Pa., a corporation of Pennsylvania Application April 26, 1933, Serial No. 668,011

19 Claims. (Cl. 188—151)

This invention relates to brake and clutch control devices and particularly to devices for controlling the operation of the cable drums of hoisting engines, excavators and the like.

It is an object of this invention to provide a control device for the brake of a cable drum or like mechanism wherein the brake is operated pneumatically and controlled by a self-lapping brake valve device such as is disclosed in the copending application of Ewing K. Lynn and Rankin J. Bush, Serial No. 569,158, Brake Valve Devices, filed October 16, 1931, assigned to the assignee of this application, and wherein the brake valve device is operated by a foot pedal that is subject to brake cylinder pressure so that an indication of the brake cylinder pressure obtained at various positions of the operating pedal may be sensed by the operator.

A further object of the invention is to provide a control device for a hoisting engine or excavator drum brake wherein the brake is automatically released upon initial movement of the drum in response to the application of power to the drum, and wherein the pressure of the fluid to which the brake pedal is subjected is automatically increased upon said initial movement of the drum for giving the operator an indication that the drum is connected to the driving engine and that it is then safe to release the brakes.

A further object of the invention is to provide a control device for the brake of a hoisting engine or excavator drum wherein the brake for the drum comprises a band pneumatically operated by a piston contained within a brake cylinder and wherein valve mechanism is provided which is operated by the brake band when the drum is moved in response to the application of power thereto, for effecting an initial release of the brake the instant that the cable drum is moved as a result of the application of power thereto and for effecting the delivery of reservoir pressure to the indicating mechanism associated with a manual brake switch device whereby the operator is apprised of the movement of the drum under power.

These and other objects that will be made apparent throughout the further description of the invention are attained by means of the control apparatus hereinafter described and illustrated in the accompanying drawings, wherein;

Fig. 1 is a plan view partially in section, showing the improved control apparatus applied to a hoisting engine;

Fig. 2 is an elevational view partially in section, showing the control and brake apparatus in release position;

Fig. 3 is an elevational view partially in section, showing the apparatus in application position wherein the brake is applied to the cable drum of the hoist;

Fig. 4 is an elevational view partially in section, showing the position of the parts when the brake is applied and when the power clutch has engaged and has moved the cable drum in a direction tending to wind the cable;

Fig. 5 is a fragmental sectional view taken on the line 5—5 of Fig. 1; and

Figure 6:
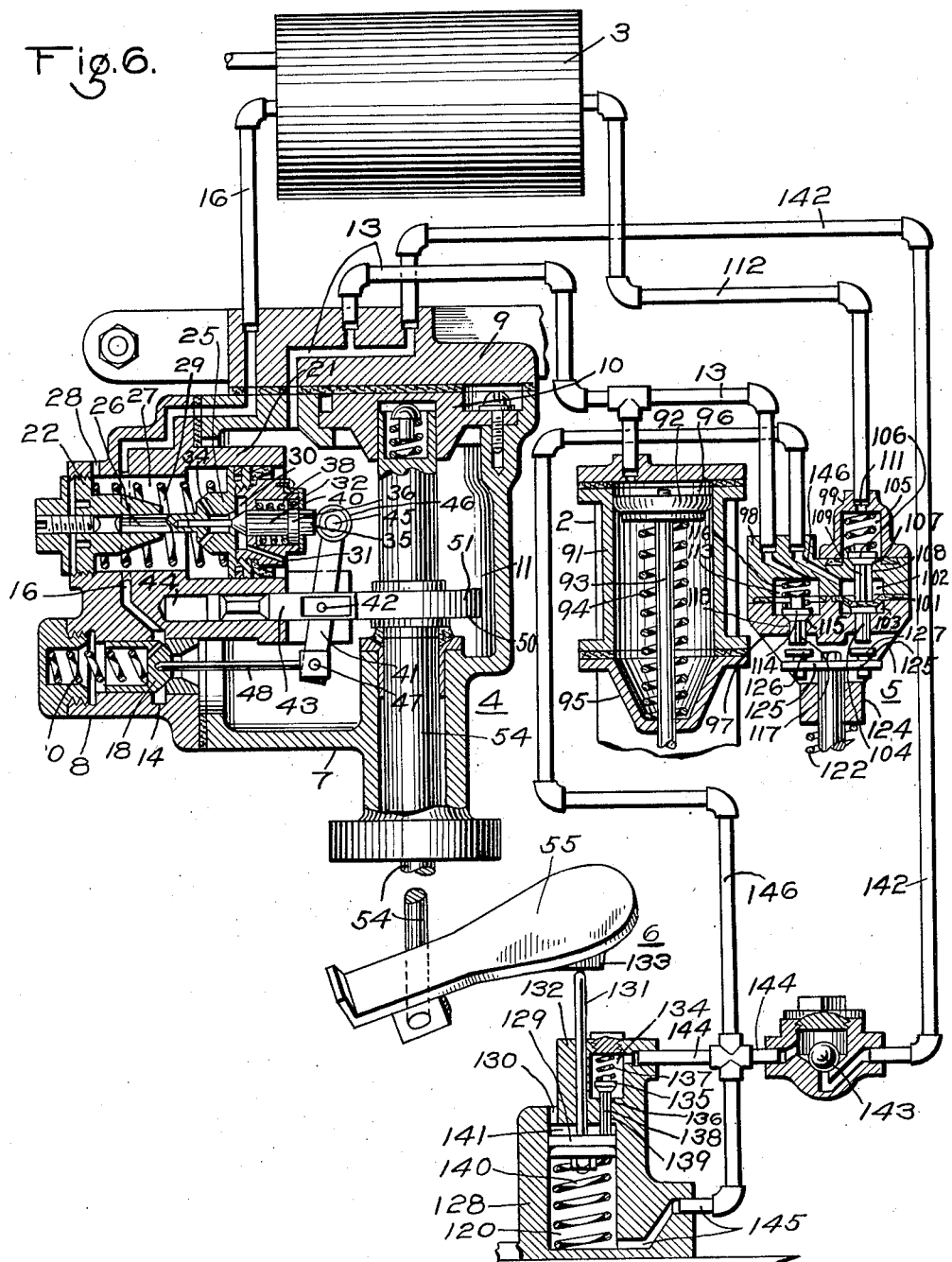
Fig. 6 is a diagrammatic sectional view of the fluid control system on enlarged scale.

Referring to the drawings, the apparatus includes a hoisting engine 1, a brake cylinder 2, a main reservoir 3, a self-lapping brake valve device 4, a release valve device 5 and a fluid actuated indicating device 6.

The self-lapping valve device which is similar to that disclosed in the above noted copending application comprises four casing members 7, 8, 9 and 10 which are secured together with gaskets therebetween, as indicated in Figs. 1 and 6 and which form a pressure chamber 11 which may be constantly in communication with a brake cylinder 2 through a pipe and passage 13. The casing section 8 is provided with a chamber 14 with which a reservoir 3, adapted to be maintained charged with fluid under pressure, is in constant communication through a pipe and passage 16. Contained in the chamber 14 and slidably mounted therein is a supply valve 18 which is subject on one side to the pressure of a coil spring 20. This valve is operative to control communication from the chamber 14 to the chamber 11.

The casing section 8 is provided with a cylinder 21 which is open at one end to the chamber 11, the other end of the cylinder being closed by an adjusting member 22, which is threaded within the casing member 8.

Operatively mounted in the cylinder 21, adjacent to its open end, is a movable abutment in the form of a piston 25 having a stem 26 which is slidably guided in a bore within the member 22. At one side of the piston 25 there is a chamber 27 which is constantly open to the atmosphere through a passage 28. Contained in the chamber 27 is a coil spring 29 which is interposed between and engages the inner face of the piston 25 and an inner face of the adjusting member 22.

Contained in a valve chamber 30 in the piston 25 which is open to the pressure chamber 11 through a passage 31, is an exhaust or release valve 32 which is adapted to be seated on the piston, and which is operative to control communication from the valve chamber 30 to the chamber 27 by way of passages 34 in the piston stem 26. The exhaust or release valve 32 is provided with a stem 35 and is normally yieldingly retained in open position by the pressure of a light coil spring 38. Outward movement of the valve relative to the piston is limited by the collar 36 engaging a stop plate 40 secured to the piston 25. The outer end portion of the valve stem 35 extends through an opening in the stop plate and beyond the outer face of the piston, and is adapted to be operatively engaged by an operating mechanism which will now be described.

For controlling the operation of the supply and exhaust valves 18 and 32, respectively, a mechanism is provided comprising a pair of levers 41, one of which is shown, which are pivotally connected intermediate their ends, to a pin 42 mounted in a plunger 43 which at one end is slidably guided within a bore 44 provided in the casing section 8.

At one side of the pivot pin 42, the ends of the levers 41 are connected together through the medium of a pin 45 and loosely mounted on the pin 45 and disposed between the levers is a roller 46 which is adapted to operatively engage the outer end of the exhaust valve stem 35. At the other side of the pivot pin 42, the ends of the levers are connected together by means of a pin 47, on which one end of an operating rod 48 is pivotally mounted, the opposite end of the rod operatively engaging one side of the supply valve 18.

For the purpose of controlling the operation of the plunger 43, a rotatable cam 50 is provided having a peripheral cam surface 51 adapted to operatively engage the outer end of the plunger. This cam is secured to an operating shaft 54 which is rotatably mounted in the casing sections 7 and 10. The operating shaft may be rotated through the medium of a foot pedal device 55.

With the brake valve foot pedal 55 in release position, as shown in Figs. 1 and 2, the operating cam 50 is also in release position. With the cam in this position, the outer end of the plunger 43 may be out of engagement with the cam surface 51. It will be noted that the cam, in its release position, does not exert any inward pressure on the plunger 43, so that the pressure of the spring 20 maintains the supply valve 18 seated and the pressure of the spring 38 maintains the exhaust valve 32 unseated.

With the exhaust valve unseated, the brake cylinder 2 is open to the atmosphere through pipe and passage 13, pressure chamber 11 in the brake valve device, passage 31 in the piston 25, valve chamber 30, past the unseated valve 32, through passage 34 in the piston 25, spring chamber 27 and passage 28.

It will here be understood that both of the springs 38 and 20 are of less resistance than spring 29, so that exhaust valve 32 can be seated against the resistance of spring 38 without compressing spring 29 and when valve 32 is seated, the supply valve 18 can be unseated against the resistance of spring 20 without compressing spring 29.

To effect an application of the brake by supplying fluid under pressure to the brake cylinder, the brake valve foot pedal 55 is pressed downwardly, causing the shaft 54 and cam 50 to turn in a clockwise direction, Fig. 2. As the cam 50 is thus moved, the cam surface 51 engages and forces the plunger 43 and pivot pin 42 inwardly, i. e., toward the casing section 8. Since the spring 20, acting on one side of the supply valve 18, offers greater resistance to the inward movement of the lever 41 than does the spring 38, acting on the release valve 32, the supply valve 18 and rod 48, during the initial movement of the pedal 55 toward application position, are maintained stationary, so that the pin 47 forms a stationary fulcrum for one end of the levers 41. Now as the plunger 43 and pin 42 are moved inwardly by the action of the cam 50, the levers 41 are caused to turn about the pin 47 in a counter-clockwise direction and as the levers are thus moved, the roller 46 moving therewith causes the exhaust valve 32 to be seated against the opposing pressure of the spring 38, thus closing the atmospheric communication from the chamber 11 in the brake valve device and consequently from the brake cylinder 2 to the atmosphere.

When the release valve 32 is seated, the value of the spring 29 acting on the piston 25 being greater than the value of the spring 20, the piston 25 will remain stationary, so that the pin 45 now becomes the fulcrum for the lever 41, and as the pedal 55 is moved further inwardly, the end of the lever 41 carrying the rod 48 is moved in a clockwise direction, and through the medium of the rod 48, causes the supply valve 18 to be unseated against the opposing pressure of the spring 20. Fluid under pressure in the valve chamber 14, supplied from the reservoir 3 through pipe and passage 16, then flows to the brake cylinder 2 through pressure chamber 11 in the brake valve device and passage and pipe 13, thus effecting an application of the brake through the medium of the apparatus to be hereinafter described.

Now when the pressure of the fluid supplied to the brake cylinder and acting in chamber 11, on one side of the piston 25, is slightly greater than the opposing pressure of the spring 29 acting on the other side of the piston, the piston will move inwardly or in a direction toward the left, as shown in Fig. 1, until the spring 29 is so compressed that its resisting force substantially equals the fluid pressure in chamber 11.

As the piston 25 is thus being moved, the action of the spring 20 causes the supply valve 18 to move toward its seat. Through the medium of the rod 48, the action of the valve 18 causes the lever 41 to rock about the pivot pin 42 in a counter-clockwise direction, maintaining the exhaust valve 32 closed. Now, with the supply valve 18 seated or closed, the further flow of fluid under pressure from the reservoir to the chamber 11 is closed off and the inward movement of the piston 25 is stopped by the action of the spring 29. Since the piston 25 is brought to a stop at substantially the same time that the supply valve 18 seats, the spring 20 acting through the medium of the rod 48, pin 47, lever 41, pin 45, roller 46 and exhaust valve stem 35, will maintain the exhaust valve 32 seated, thus the brake valve device is automatically operated to lap the supply valve while holding the exhaust valve closed.

If, when the several parts of the brake valve device have been moved to lap position as just described, it is desired to reduce brake cylinder pressure, the brake valve pedal 55 is moved in a counter-clockwise direction. As the pedal is thus being moved, the cam surface 51 of the cam 50 tends to gradually recede from the end of the plunger 43, permitting the spring 38 to act to unseat the exhaust valve 32, the valve 32 as it is being unseated rocking the lever 41 in a clockwise direction about the pin 47, which is maintained stationary by the resistance offered by the stronger spring 20 through the medium of the supply valve 18 and the rod 48.

With the exhaust valve 32 thus unseated, fluid under pressure is released from the brake cylinder 2 to the atmosphere through pipe and passage 13, chamber 11 in the brake valve device, passage 31 and exhaust valve chamber 30 in the piston 25, past the unseated exhaust valve 32 through passages 34 in piston 25, spring chamber 27 and atmospheric passage 28. When the brake cylinder pressure has been reduced sufficiently to permit the spring 29 to move the piston against the reduced fluid pressure, the piston moves until the seat therein engages the valve 32. The further venting of fluid from the brake cylinder is then cut off and the parts remain in this position, possibly slightly compressing the spring 38.

With the valve 32 seated, the further release of fluid under pressure from the brake cylinder 2 and pressure chamber 11 is prevented and consequently the piston 25 will come to a stop without rocking the lever 41 to unseat the supply valve 18, thus the brake valve device is automatically lapped after a reduction in brake cylinder pressure has been effected.

To effect a complete release of the brakes, the pedal 55 is returned to release position, moving the cam 50 to its release position, the pedal being stopped in release position by its engagement with a limiting stop 58 mounted on the exterior of the casing 7. As the cam is being moved to this position, the action of the spring 38 causes the exhaust valve 32, carried by the piston 25, to be unseated as before described, permitting fluid under pressure to flow from the chamber 11 and brake cylinder 2 to the atmosphere. As the pressure of fluid in chamber 11 reduces, the piston 25 is caused to move toward the right by the action of the spring 29. The unseated exhaust valve 32 now moves forward with the piston, causing the lever 41 to turn in a clockwise direction about the pin 47. Through the medium of the pin 42, this movement of the lever causes the plunger 43 to move longitudinally toward the cam 50 to substantially the position in which it is shown in Fig. 2. Since the supply valve 18 is maintained seated and the exhaust valve 32 unseated, the brake cylinder 2 is open to the atmosphere, consequently the complete release of the brake apparatus is effected.

The hoisting engine 1 may comprise a cable drum 61 having an end flange 62 provided with a brake drum portion 63, and an end flange 64 that is provided with a clutch portion 65, having a conical clutch face 66 that is adapted to be engaged by a conical clutch member 67 having an annular groove 68 for receiving an operating yoke 69 that is pivotally mounted upon a support 71 for rotation about a pin 72. The cable drum 61 is mounted for rotation upon a shaft 73 that is rotatably supported in bearings 74 mounted on the base 75, and a cable 76 is wound upon the drum 61 which is driven through the medium of the detachable clutch member 67.

The clutch member 67 is splined upon the shaft 73 so that it may be moved into and out of driving engagement with the clutch flange 65 of the drum by the yoke 69. The drum 61 is adapted to be rotated by an electric motor 77 mounted upon the base 75 and which is provided with a pinion 78 that meshes with a spur gear 79 that is keyed to the shaft 73. The yoke 69 is operated by a fluid pressure actuated piston rod 81 that is connected to a piston, not shown, within an operating cylinder 82. The operation of the rod 81 may be controlled in any desired manner. The motor 77 is of a reversible type and consequently the drum 61 may be rotated in either direction and the drum 61 may be disconnected from driving engagement with the motor by moving the clutch member 67 out of driving engagement with the clutch flange 65 of the drum.

The movement of the drum may be retarded or arrested by means of a brake band 83 that partially surrounds the brake drum, the end of the band being pivotally connected to pins 84 and 85 carried upon a rocking lever 86, that is pivotally mounted upon a fulcrum pin 87 that is fixed to a valve operating rod 88. The free end of the lever 86 is pivotally connected to the piston rod of the brake cylinder 2.

The brake cylinder device 2 comprises a cylindrical casing 91 containing a piston 92 having a rod 93 that is surrounded by a spring 94 which engages the piston 92 at one end and the end wall 95 at the other end and which serves to yieldingly retain the piston 92 in release position shown in Fig. 2. The piston rod 93 is connected to the rocking lever 86 by a pivot pin 80, and when fluid under pressure is supplied to the chamber 96 at the upper side of the piston 92 through pipe 13, the piston 92 is moved downwardly and causes rotation of the operating lever 86 in a counter-clockwise direction, thereby causing the brake band 83 to be tightened about the brake drum 63 for retarding or arresting movement of the cable drum 61.

The release valve device 5 comprises a casing having three sections 97, 98 and 99 that may be secured together in any desired manner. A flexible diaphragm 101 is disposed between the casings 97 and 98 and has at one side a chamber 102 in the casing section 98 and at the other side a chamber 103 in the casing 97 containing a valve operating stem 104, which engages the under face of the diaphragm and extends exteriorly of the casing section 97 as indicated in Fig. 2. The casing section 99 is provided with a chamber 105 containing a supply valve 106 adapted to seat upon a valve seat 107 and which controls communication from the chamber 105 to the chamber 102 through passage 108. The valve 106 is provided with a stem 109 which is guided in the passage 108 and extends into engagement with the flexible diaphragm 101. The valve 106 is normally yieldingly pressed against the valve seat 107 by a spring 111 within the chamber 105. The chamber 105 is connected to the main reservoir 3 by means of a pipe and passage 112.

Between the casing sections 97 and 98 an exhaust valve chamber 113 is formed containing a valve 114 that is yieldingly pressed against the valve seat 115 by a spring 116 within the chamber 113. The valve 114 is provided with a fluted guide stem 117 that extends exteriorly of the casing section 97 through an atmospheric passage 118.

The valve operating shaft 88 upon which the brake lever 86 is pivoted, is mounted for vertical movement in a guide sleeve 119, the downward movement of the shaft 88 being limited by means of a collar 121 fixed to the shaft 88 and which engages the upper end of the guide sleeve 119. The shaft 88 is yieldingly retained in its lowermost position shown in Fig. 2 by a spring 122 that is disposed between a collar 123 fixed to the shaft 88 and a guide sleeve 124 on the casing section 97. A transverse bar 125 is fixed to the upper end of the shaft 88 and carries two adjustable tappet screws 126 and 127 for respectively engaging the stem 117 of the valve 114 and the stem 104 for operating the valve 106, when the shaft 88 is moved upwardly in the manner to be hereinafter described.

The indicating device 6 comprises a relatively small cylinder 128 containing a piston 129 having a rod 131 extending exteriorly through a guide sleeve 132 on the cylinder, into engagement with a lug 133 on the under face of the foot pedal 55. The cylinder casing 128 is provided with a chamber 134 at the upper side of the piston 129 containing a valve 135 that is yieldingly pressed against a seat 136 by a spring 137 within the chamber 134. The valve is provided with a stem 138 that extends through and is guided in a passage 139 connecting the chamber 141 at the upper side of the piston 129 with the chamber 134. A spring 140 within the cylinder 128 serves to normally yieldingly retain the piston 129 in its upper or release position wherein it engages the stem 136 of the valve 135 and holds it open so that fluid under pressure may flow from the chamber 120 beneath the piston 129, to atmosphere through passage 130, for a purpose to be hereinafter explained.

In charging, fluid under pressure is supplied from the reservoir 3 to the valve chamber 14 through pipe and passage 16. Fluid under pressure is also supplied from the reservoir 3 to the chamber 105 of the release valve device 5 through pipe and passage 112. With the parts of the apparatus in release position, as shown in Figs. 1 and 2, the chamber 96, at the upper side of the piston 92 within the brake cylinder 2, is open to the atmosphere through pipe and passage 13, chamber 11 of the self-lapping valve device 4, past release valve 32, passages 34, chamber 27 and atmospheric passage 28. The chamber 113 of the release valve device 5 is then open to the atmosphere through the passage and pipe 13 in the manner just described.

In operation, with the parts of the apparatus in release position, the clutch member 67 in engagement with the operating drum 61 and the brake band 83 in release position, to apply the brakes when it is desired to retard or arrest movement of the cable drum 61, the foot pedal 55 is depressed by the foot of the operator, thereby rotating the cam 50 and depressing the plunger 43 of the self-lapping valve device 4. As previously described, the release valve 32 is first caused to move to closed position and subsequently the plunger 48 causes opening movement of the supply valve 18, thereby permitting fluid under pressure to flow from the main reservoir to the brake cylinder through pipe and passage 16, valve chamber 14, past supply valve 18, chamber 11, and passage and pipe 13. The brake piston 92 is moved downwardly against the action of the spring 94, thus turning the brake lever 86 in a counter-clockwise direction and tightening the brake band 83 upon the brake drum 63. As previously described, the pressure of the fluid acting on the brake piston is determined by the degree of movement of the foot pedal 55 toward application position. When the brake band pressure is sufficient to hold the cable drum and connected load stationary, the clutch 67 may be disengaged from the drum.

Fluid at brake cylinder pressure is supplied at this time to the chamber 120 of the indicating device 6, from the chamber 11 through passage 13 (see Figs. 1 and 2), pipe 142, past the ball check valve 143, pipe 144 and pipe 145. The fluid at brake cylinder pressure acting on the under face of the piston 129 causes the latter to increase the pressure, opposing movement of the pedal 55, with a sensible force and to thereby apprise the operator of the degree of pressure of the fluid supplied to the brake cylinder and acting on the brake piston, so that he may cause the clutch 67 to be disengaged from the drum at the proper time.

When the brake is applied, the parts of the apparatus occupy the position shown in Fig. 3, at which time fluid under pressure is acting on the upper face of the brake piston 92 and on the under face of the indicating piston 129, the pressure applied to the latter piston being the same as that applied to the brake piston since both pistons are supplied from the chamber 11 of the self-lapping brake valve device. The brakes remain applied so long as the foot pedal 55 is depressed and the force with which the brake band 83 is applied to the brake drum depends upon the pressure of the fluid applied to the brake piston, which pressure is determined by the position of the operator's foot pedal 55.

In order to release the brakes, it is only necessary for the operator to permit the foot pedal 55 to return to release position as shown in Figs. 1 and 2, and when the foot pedal is in release position, the cam 50 permits the plunger 43 to move outwardly and cause the closing movement of the supply valve 18 and opening movement of the exhaust valve 32 in the manner previously described. When the valves are in the release position, fluid is exhausted to atmosphere from the brake cylinder in the manner described.

When the cable 76 is loaded and the drum is being held stationary by the brake band 83, it is necessary to disconnect the drum from the motor and, therefore, the clutch 67 is disengaged from the clutch drum 65. In the event that it is desired to rotate the drum 61 so as to wind up the cable 76 while the latter is loaded, power must be applied for driving the drum before the brake is ultimately released, therefore, means are provided for automatically initiating release of the brake and for giving the operator an indication that the clutch member 67 has engaged the clutch drum 65 and will support the load when the brake is released. When the clutch member 67 has engaged the clutch drum 65 with sufficient force to cause it to rotate and wind up the cable 76 and the drum is rotated in a clockwise direction, Fig. 3, the upper end of the brake band attached to the pin 84 on the brake lever 86 tends to rotate the brake lever in a counter-clockwise direction about the pin 80 as a fulcrum. The force applied to the pin 84 turns the brake lever 86 about the pin 80 and causes the shaft 88 to be lifted to the position shown in Fig. 4, wherein the tappet screws 126 and 127 engage the stems 117 and 104 and cause the opening movement of the valves 118 and 106 respectively. With the valve 106 open, fluid at reservoir pressure is supplied to the under face of the piston 129 through pipe and passage 112, chamber 105, past the open valve 106, passage 108, chamber 102, passage and pipe 146, pipe and passage 145 and chamber 120. The increase of pressure of the fluid acting on the piston 129 quickly increases the pressure on the piston and foot pedal 55, thereby moving it to release position and indicating to the operator that the cable drum has been moved by the clutch. At the same time that the valve 106 is opened, the valve 114 is opened and permits exhaust of fluid under pressure from the chamber 96 of the brake cylinder through pipe and passage 13, chamber 116, past the valve 114 and the atmospheric passage 118. As a result of the foregoing operation, the brakes are initially released and the operator warned at the instant the power has been applied to the brake drum with sufficient force to sustain the load and to turn the hoisting drum so as to wind up the cable on the drum and raise the load.

The ball check valve 143 is provided to prevent fluid under pressure from flowing from the main reservoir to the chamber 11 of the self-lapping brake valve device and thereupon causing the piston 25 to move away from the exhaust valve 32 and open communication from the main reservoir to the atmosphere.

When the brakes are released in the manner above described, as the result of movement of the cable drum under power, the valve operating shaft 88 moves to release position shown in Fig. 2 and the valve 106 is moved to closed position by the spring 111. The fluid under reservoir pressure trapped at this time in the chamber 120 is released to atmosphere through pipe 144, chamber 134, past the valve 135 which is then held open by engagement with the indicating piston 129, chamber 141 and atmospheric passage 130. The pressure on the piston 129 is thus reduced to atmospheric pressure and the piston may be again depressed by the operator when another application of the brake is desired.

The release valve device 5 is disposed adjacent the brake cylinder through a relatively short passage and, therefore, initial release of the brake cylinder pressure to effect release of the brake is effected with substantially no time delay. Since the operator receives an indication that the clutch has engaged the drum and is causing it to turn, he does not oppose movement of the foot pedal 55 to release position by the piston 129. As a result, the self-lapping brake valve device 4 is automatically operated to release position wherein release valve 32 is opened to permit further release of fluid under pressure from the brake cylinder through passage 28 and wherein supply valve 18 is maintained closed to prevent the flow of fluid under pressure from reservoir 3 to the brake cylinder 2 which flow of fluid under pressure would be effective, in part at least, to counteract the effect of the exhaust of fluid under pressure from the brake cylinder past valve 114 and prevent complete release of the brake. It will be understood that the recession of the cam 50 from the end of stem 43, by movement of foot pedal 55 to release position, is effective, as previously described, to cause the release valve 32 to be opened and the supply valve 18 to be maintained closed.

If the operator, after sensing the increased upward pressure on the pedal 55 exerted by piston 29, opposes such pressure and prevents the piston from moving the pedal to release position, as above described, supply valve 18 would open and cause fluid under pressure from reservoir 3 to be supplied therepast to the brake cylinder 2 and the effect of the reduction in fluid pressure in the brake cylinder caused by exhaust of fluid under pressure past valve 114 would be, in part at least, counteracted, with the result that the brake would not completely release. In such case, the supply valve 18 is caused to open due to the exhaust of fluid under pressure from chamber 11 of the brake valve device 4 through passage and pipe 13 and past valve 114, the consequent reduction in fluid pressure in chamber 11 permitting the spring 29 to move the piston 25 to pivotally move the levers 41 about pivot pin 42 on stem 43, which is restrained against outward movement by cam 50, which movement of levers 41 causes movement of stem 48 to unseat the supply valve 18.

It is apparent from the foregoing that I have provided a simple and effective means for controlling a motor driven cable hoist engine and have provided a simple means for indicating to the operator the time at which the clutch assumes the load on the drum so that there is little danger of the brakes being held applied when the clutch is sufficiently engaged with the cable drum clutch to drive the drum.

While but one embodiment of the invention is disclosed herein, it is obvious that omissions, additions and other changes may be made in the construction shown without departing from the spirit of the invention.

Having now described my invention, what I claim as new and desire to secure by Letters Patent, is:

1. The combination with a driven member, power means for driving said driven member and means for arresting movement of said driven member, of manually operable means for controlling the arresting means, and means automatically actuated upon movement of said driven member to effect an indication through the manually operable means when power is applied to said driven member.

2. The combination with a driven member, power means, means for arresting movement of said driven member, power driven means for actuating said arresting means, of a manually operable means for controlling the application of power to said arresting means, and means acting on said controlling means for indicating the degree of power acting on said arresting means.

3. The combination with a driven member, power means, means for arresting movement of said driven member, and power driven means for actuating said arresting means, of a manually operable means for controlling the application of power to said arresting means, means acting on said controlling means for indicating the degree of power acting on said arresting means, means for varying the force with which the means acting on said controlling means acts on said controlling means for giving a sensible indication, and means for controlling said force varying means actuated by power supplied by the said power means when power is applied to said driven member.

4. The combination with a driven member, power means, means for arresting movement of said driven member, and power driven means for actuating said arresting means, of a manually operable means for controlling the application of power to said arresting means, means acting on said controlling means for indicating the degree of power acting on said arresting means, means for varying the force with which the means acting on said controlling means acts on said controlling means for giving a sensible indication, and means for controlling said force varying means actuated through said arresting means when power is applied to said driven member.

5. The combination with a driven member, power means for driving said member, fluid pressure actuated means for arresting movement of said driven member, a self-lapping valve device for controlling the delivery of fluid under pressure to and from said pressure actuated means for effecting application and release of the arresting means, and a manually operable means for actuating said valve device, of means responsive to variations in fluid pressure acting on said arresting means and acting through said manually operable means for sensibly indicating the pressure of the fluid acting on said arresting means and means actuated by said driven means for effecting a variation of the pressure acting on said pressure responsive means.

6. The combination with a driven member, power means for driving said member, fluid pressure actuated means for arresting movement of said driven member, a self-lapping valve device for controlling the delivery of fluid under pressure to and from said pressure actuated means for effecting application and release of the arresting means, a manually operable means for actuating said valve, of means responsive to variations in fluid pressure acting on said arresting means and acting through said manually operable means for sensibly indicating the pressure of the fluid acting on said arresting means, and means for varying the pressure on said pressure responsive means, responsive to movement of said driven member by said power means for effecting a sensible indication of said movement.

7. The combination with a driven member, power means for driving said member, a fluid pressure actuated brake for the driven member, a self-lapping valve device for controlling the delivery of fluid under pressure to said brake and a manually operable means for actuating said valve, of means subject to fluid pressure acting on said brake and acting through said manually operable means for sensibly indicating the pressure of the fluid acting on said brake, and means for varying the pressure on said pressure subjected means, responsive to movement of said driven member, for effecting a sensible indication when the driven member is moved by said power means.

8. The combination with a driven member, power means for driving said member, a fluid pressure actuated brake for the driven member, a self-lapping valve device for controlling the delivery of fluid under pressure to said brake, and a manually operable means for actuating said valve device, of means subject to fluid pressure acting on said brake and acting through said manually operable means for sensibly indicating the pressure of the fluid acting on said brake, and means responsive to movement of the driven member by said power means for relieving the fluid pressure acting on the brake for releasing the brakes.

9. The combination with a driven member, power means for driving said member, a fluid pressure actuated brake for the driven member, a self-lapping valve device for controlling the delivery of fluid under pressure to said brake, and a manually operable means for actuating said valve, of means subject to fluid pressure acting on said brake and acting through said manually operable means for sensibly indicating the pressure of the fluid acting on said brake, and valve means operated by the brake when the driven member is moved by said power means for relieving the fluid pressure acting on the brake for initiating release thereof.

10. The combination with a driven member, power means for driving said member, a fluid pressure actuated brake for the driven member, a self-lapping valve device for controlling the delivery of fluid under pressure to said brake, and a manually operable means for actuating said valve, of means subject to fluid pressure acting on said brake and acting through said manually operable means for sensibly indicating the pressure of the fluid acting on said brake, and valve means responsive to movement of the driven member by said power means for substantially simultaneously varying the pressure on said pressure subjected means for effecting a sensible indication and for relieving the fluid pressure acting on the brake for initiating release thereof.

11. The combination with a rotatable member and motor means for rotating said member, of braking means operated by fluid under pressure for applying the brakes to said member, a manually operated element for controlling the fluid pressure on said braking means, a device operated by fluid under pressure for opposing manual pressure applied to said manually operated element, and means operative upon rotation of said member for supplying fluid under pressure to said device.

12. The combination with a driven member, a fluid pressure actuated brake for the driven member, a self-lapping valve device for controlling the delivery of fluid under pressure to said brake, and a manually operable means for actuating said valve device, of means responsive to variations in fluid pressure and acting through said manually operable means for sensibly indicating the pressure of fluid acting on said brake, and means actuated by said driven means upon movement thereof for effecting a variation of fluid pressure acting on said pressure responsive means.

13. The combination with a driven member, power means for driving said driven member, braking means for said driven member, fluid pressure responsive means adapted upon variations in fluid pressure acting thereon to apply or release said braking means, and a self-lapping brake controlling valve device adapted to be manually operated to vary the fluid pressure acting on said fluid pressure responsive means for effecting the application and release of said braking means, of a valve device, automatically operable by said driven member upon initial movement thereof by said power means, adapted to vary independently of said brake controlling valve device the fluid pressure acting on said fluid pressure responsive means for initiating release of said braking means, and means operated upon the automatic operation of said valve device, for causing said brake controlling valve device to be operated to effect release of said braking means.

14. In combination, driven means, power means for driving said driven means, means for arresting movement of said driven means, controlling means manually operable to effect application and release of the said arresting means, and means actuated by said driven means through said arresting means upon movement of said driven means by said power means, for independently initiating release of said arresting means and for also automatically causing operation of said controlling means to release the said arresting means unless operation of the controlling means is prevented by manual effort of the operator.

15. In combination, driven means, power means for driving said driven means, means for arresting movement of said driven means, controlling means manually operable to effect application and release of the said arresting means, and means operated upon initial movement of said driven means by said power means for automatically effecting operation of said controlling means to effect release of the arresting means unless operation of the controlling means is prevented by manual effort of the operator.

16. In combination, a driven member, power means for driving said driven member, fluid pressure operated braking means for braking the said driven means, valve means manually operable to vary the fluid pressure on said braking means to effect application and release thereof, fluid pressure responsive means operative to operate said valve means to release said braking means, and means actuated upon rotation of said driven member by said power means for causing operation of said fluid pressure responsive means.

17. In combination, a driven member, power means for driving said driven member, fluid pressure operated braking means for braking the said driven means, valve means manually operable to vary the fluid pressure on said braking means to effect application and release thereof, fluid pressure responsive means operative to operate said valve means to release said braking means, and means actuated upon rotation of said driven member by said power means for reducing the fluid pressure on said braking means and for simultaneously causing operation of said fluid pressure responsive means whereby said valve means is operated to also reduce the fluid pressure on said braking means.

18. In combination, driven means, driving means for driving said driven means, brake means for said driven means, means manually operative to cause application and release of the brake means, and means operative by movement of the brake means as a result of initial movement of the driven means by the driving means for effecting operation of the manually operative means to cause release of the brake means, unless such operation of the manually operated means is inhibited by manual effort of the operator.

19. In combination, a driven member, power means for driving the driven member, brake means acting on the driven member, means manually operative to cause application and release of the brake means, fluid pressure responsive means effective upon an increase in pressure to operate the manually operative means to effect release of the brake means unless such operation is opposed by manual effort of the operator, and means actuated by the driven member through the brake means, upon initial movement of the driven member by the power means while the brake means is applied to the driven member, for causing fluid under pressure to be supplied to the said fluid pressure responsive means.

ROY R. STEVENS.